US008239563B2

(12) United States Patent
Khan

(10) Patent No.: US 8,239,563 B2
(45) Date of Patent: Aug. 7, 2012

(54) METHOD AND APPARATUS FOR USING MULTIPLE LINKS AT A HANDHELD DEVICE

(75) Inventor: Moinul H. Khan, Austin, TX (US)

(73) Assignee: Marvell International Ltd., Hamilton (BM)

(*) Notice: Subject to any disclaimer, the term of this patent is extended or adjusted under 35 U.S.C. 154(b) by 1164 days.

(21) Appl. No.: 10/974,493

(22) Filed: Oct. 27, 2004

(65) Prior Publication Data

US 2006/0089989 A1     Apr. 27, 2006

(51) Int. Cl.
    *G06F 15/16* (2006.01)
(52) U.S. Cl. ........................ 709/232; 709/250
(58) Field of Classification Search .................. 709/232, 709/250
    See application file for complete search history.

(56) References Cited

U.S. PATENT DOCUMENTS

| 6,956,824 | B2* | 10/2005 | Mark et al. ............... 370/242 |
| 6,978,128 | B1* | 12/2005 | Raman et al. ............. 455/414.1 |
| 2004/0098748 | A1* | 5/2004 | Bo et al. ................... 725/105 |
| 2005/0265235 | A1* | 12/2005 | Accapadi et al. .......... 370/235 |
| 2011/0200026 | A1* | 8/2011 | Ji et al. .................... 370/338 |

OTHER PUBLICATIONS

K. Chebrolu and R. R. Rao, "Communication using Multiple Wireless Interfaces," Proc. of WCNC'02, Mar. 2002, Orlando, FL.*
Phatak et al. "A Novel Mechanism for Data Streaming Across Multiple IP Links for Improving Throughput and Reliability in Mobile Environments". 2002.*
Wang et al. Multipath Source Routing in Wireless Ad Hoc Networks. IEEE. 2000. pp. 479-483.*
Traw et al. Striping within the Network Subsystem. 1995.*
Hsieh et al. A Transport Layer Approach for Achieving Aggergate Bandwidths on Multi-home Mobile Hosts. 2002.*

* cited by examiner

*Primary Examiner* — Joshua Joo
*Assistant Examiner* — Bryan Lee

(57) ABSTRACT

A network is disclosed. The network includes a server computer, a first wireless communications link communicatively coupled to the server computer, a second wireless communications link communicatively coupled to the server computer, and a handheld device communicatively coupled to the first and second wireless communications links. The handheld device concurrently receives an object from the server computer via the first and second wireless communications links.

25 Claims, 4 Drawing Sheets

METHOD AND APPARATUS FOR USING MULTIPLE LINKS AT A HANDHELD DEVICE

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

FIELD OF THE INVENTION

The present invention relates to networks; more particularly, the present invention relates to data transmission between two devices on a network.

BACKGROUND

With the proliferation of wireless handheld devices, such as personal digital assistants (PDAs) and smart phones, users are capable of communicating using voice and data communications. Thus, users may place a voice call via a cellular network and browse web pages via the cellular network or an 802.11 standard wireless network.

Often a user may need to download a large or complex web page via either the cellular or IEEE 802.11b and/or IEEE 802.11g standard link. Such a page may take to 20-30 seconds to download. Such download times may be excessive, especially if numerous pages need to be downloaded.

BRIEF DESCRIPTION OF THE DRAWINGS

The invention is illustrated by way of example and not limitation in the figures of the accompanying drawings, in which like references indicate similar elements, and in which.

DETAILED DESCRIPTION

Figure 1:
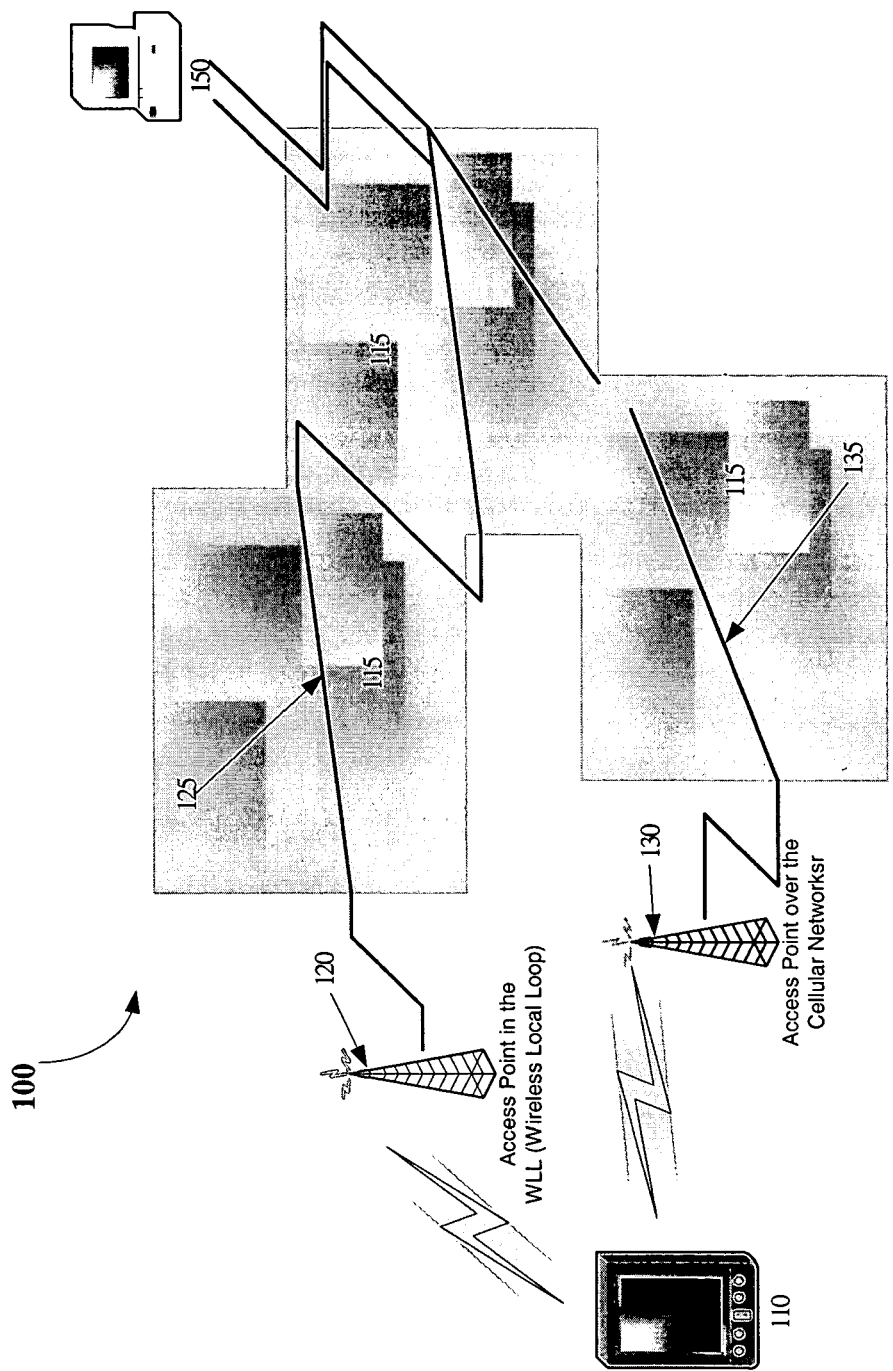
FIG. 1 illustrates one embodiment of a network.

According to one embodiment, a method for using multiple links to download data to a handheld device is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art.

An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

The instructions of the programming language(s) may be executed by one or more processing devices (e.g., processors, controllers, control processing units (CPUs), execution cores, etc.).

FIG. 1 illustrates one embodiment of a network 100. Network 100 includes a handheld device 110 coupled to a server 150 via two or more wireless communication links. For instance, data may be transmitted via radio frequency (RF) links 125 and 135. In one embodiment, RF link 125 is a link conforming to an IEEE 802.11b and/or IEEE 802.11g standards connection that transmits and receives data to/from device 110 via an access point 120 in a wireless local loop. RF link 125 may be coupled to server 150 via various networks 115. In a further embodiment, radio link 135 is a cellular connection (e.g., GSM, CDMA, etc.) that transmits and receives data to/from device 110 via cellular network access point 130. Link 135 may also coupled to server 150 via networks 115.

Figure 2:
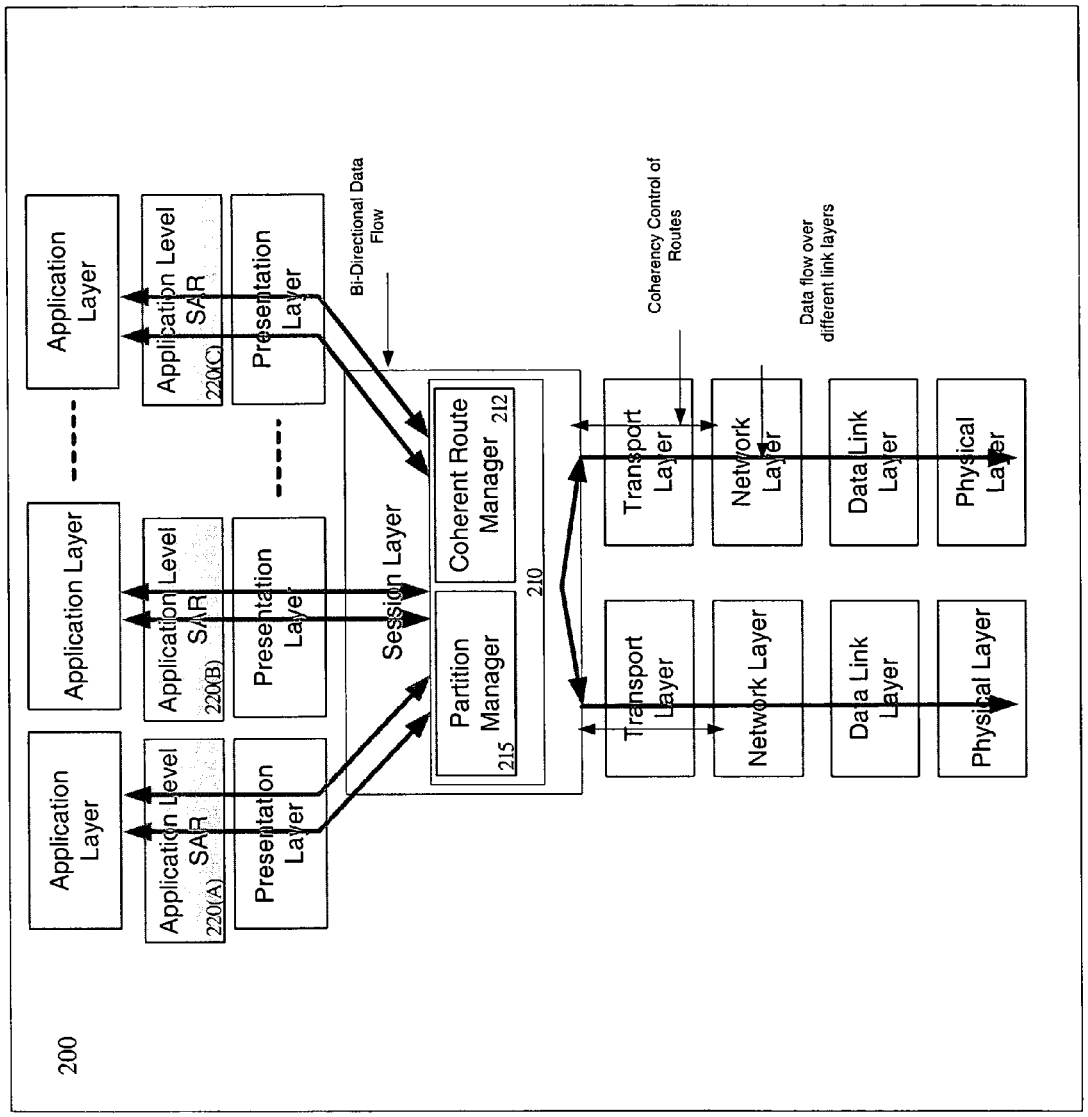
FIG. 2 illustrates one embodiment of a device.

According to one embodiment, handheld device 110 uses both RF link 125 and RF link 135 to concurrently download an object, such as a file or web page, from server 150. FIG. 2 illustrates one embodiment of a system 200 implemented to transmit data via multiple links. In one embodiment, system 200 is incorporated at both sides of the data transaction. For example, system 200 is included at both handheld device 110 and server 120.

Shown in system 200 is International Organization for Standardization (ISO) standard Open System Interconnection (OSI) model for supporting multiple applications over multiple radio links. System 200 includes application and session layer components that enable downloading data via multiple links.

Also, an additional OSI protocol stack is included for each additional radio link for which data is to be downloaded. For instance one of the stacks may be associated with link 125, while the other is associated with link 135. While system 200 shows two stacks that are used to download data via two radio links, one of ordinary skill in the art will appreciate that more than two (e.g., three or four) stacks may be included to support additional radio links.

According to one embodiment, the session layer includes a multi-radio link manager 210. Multi-radio link manager 210 identifies a transmission means for each application in the application layer. In particular, multi-radio link manager 210 multiplexes data from multiple applications into the multiple stacks. Multi-radio link manager 210 includes a coherent route manager 212 and a partition manager 215.

Coherent route manager 212 ensures that there exist two concurrent and coherent routes between the source (e.g., server 150) and destination (e.g., device 110) pair. In one embodiment, the routes are secured through source routing. However, in other embodiments the routes may be secures by other means.

Partition manager 215 determines a policy to follow for partitioning. Partitioning may be facilitated according to various embodiments. For example, where n1 is the number of cells to be transferred via radio-link 125 and n2 number of cells to be transferred via radio-link 135 concurrently, performance based, cost based and power based partitioning may be implemented.

Performance based partitioning uses route-diversity to communicate a payload over larger bandwidth. For example, for a video communication all the critical frames (e.g. I and P frames) can be transmitted through one link and the other link may be used for transmitting additional quality related information (e.g. B frames). Also for reducing the average latency and increasing the throughput of transmission one will choose n1 and n2 such that $(n1*L1+n2*L2)/(n1+n2)$ is minimized while $(n1+n2)/(n1/BW1+n2/BW2)$ is maximized Cost based partitioning involves the payload being portioned such that overall billing for the user is minimized. For example, billing may be higher on a congested route (scarcity based billing). In the case of cost based partitioning n1 and n2 may be chosen such that $(n1*COSt_A+n2*COSt_B)$ is minimized, where $Cost_A$, $Cost_B$ represent billing rates over link-A and link-B.

Power based partitioning uses route-diversity so that lower-power radio link carry higher payload than the high power consuming radio link.

System 200 also includes application level segmentation and reassembly (SAR) modules 220 at the application layer. SAR modules 220 partition and reassemble data payloads. For instance, since potentially one application (e.g., one stream of video) can be using more than one transport-layer, the application should perform a segmentation and re-assembly of payloads coming through different transport layers.

Figure 3:
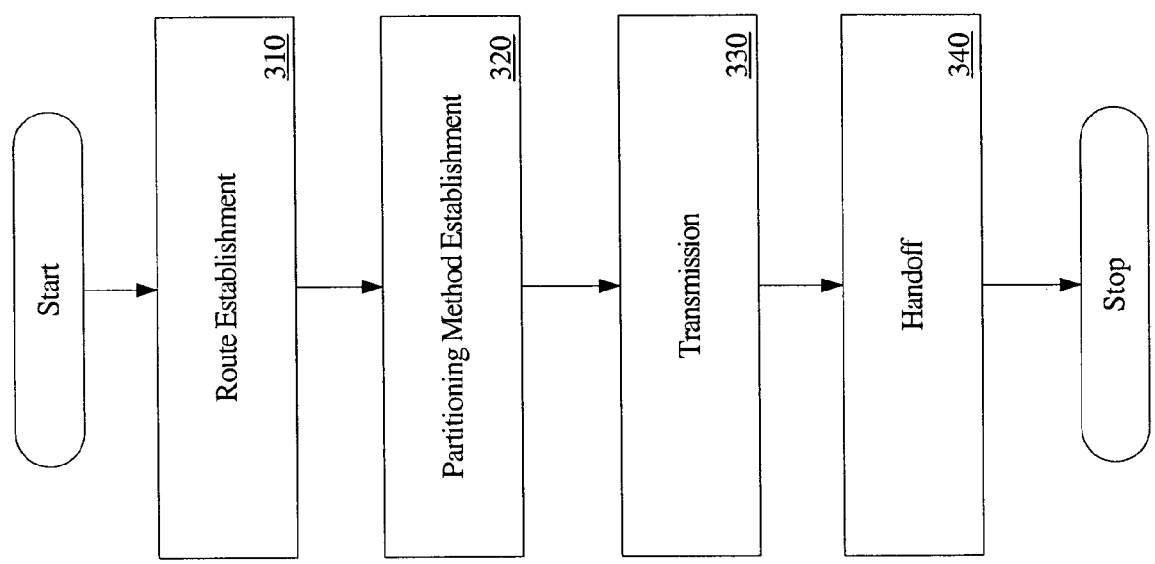
FIG. 3 illustrates a flow diagram for one embodiment of using multiple connections to download data.

FIG. 3 illustrates a flow diagram of one embodiment for concurrently transmitting data via multiple radio links. At processing block 310, a route is established. Route establishment entails coherent routes being established by coherent route manager 212. According to one embodiment, coherent route manager 212 is invoked by the application willing to use the service.

At processing block 320, a partitioning method is established. Establishing a partitioning method (e.g., performance based, cost based and power based partitioning) includes applications approving of a partitioning method and communicating the selected method with partitioning manager 215. In one embodiment, the partitioning method is controlled by the source of the data. However, in other embodiments, the partitioning method may be controlled by the destination where the destination requests the source to partition the data based upon the particular method.

At processing block 330, data is transmitted. According to one embodiment, each transport layer will have its own flow control. However, if any route falls behind, the other application can detect it and perform re-partitioning or application level flow control. At processing block 340, a handoff takes place at the data link layer. Note that in other embodiments, the partitioning method and the coherency of routes may be re-evaluated following each handoff.

Figure 4:
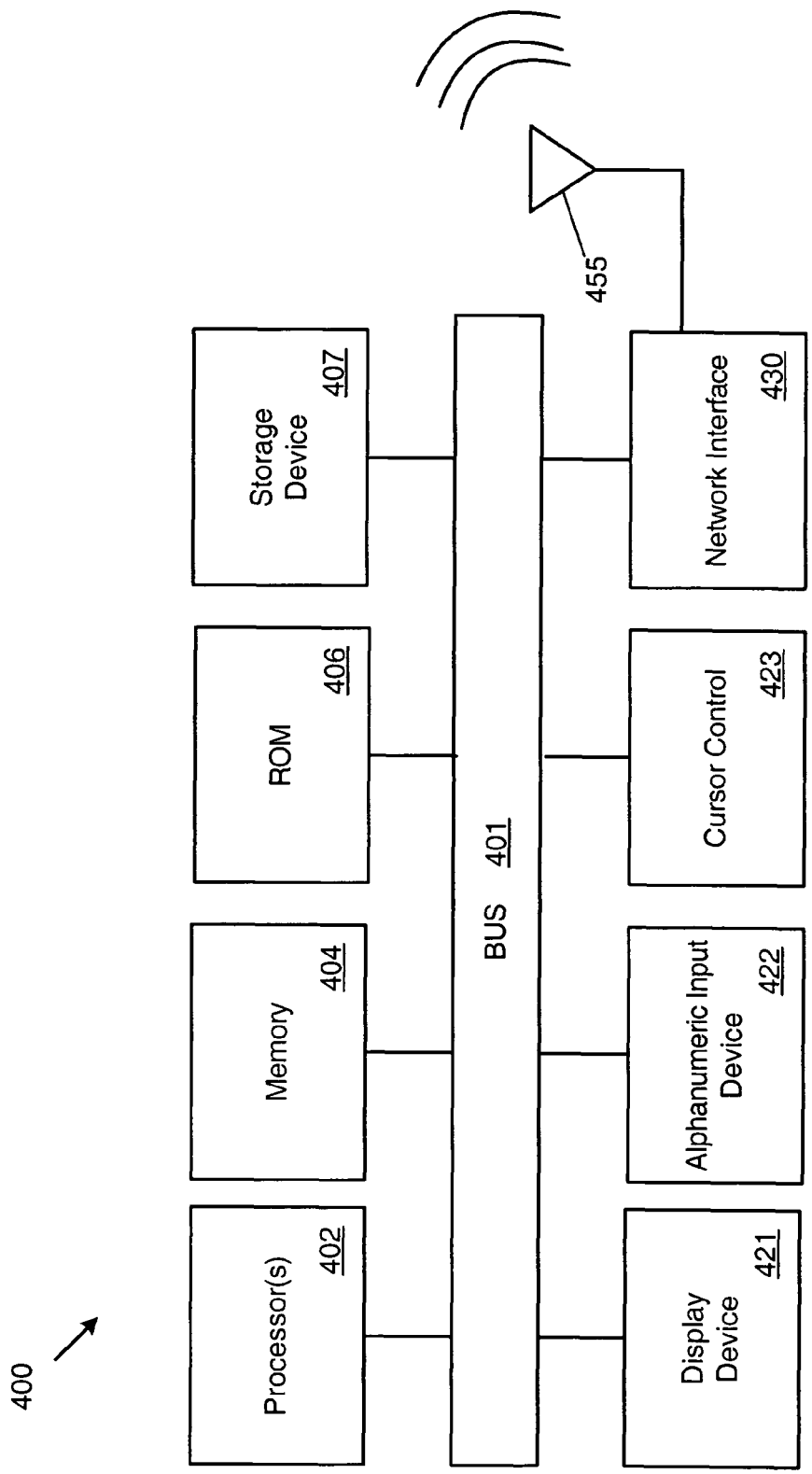
FIG. 4 illustrates a block diagram of one embodiment of a computer system.

FIG. 4 is a block diagram of one embodiment of an electronic system 400. The electronic system 400 illustrated in FIG. 4 is intended to represent handheld device 110 and/or server 150. Further, electronic system may represent a range of electronic systems including, for example, desktop computer systems, laptop computer systems, cellular telephones, personal digital assistants (PDAs) including cellular-enabled PDAs, set top boxes. Alternative computer systems can include more, fewer and/or different components.

Electronic system 400 includes bus 401 or other communication device to communicate information, and processor 402 coupled to bus 401 that may process information. While electronic system 400 is illustrated with a single processor, electronic system 400 may include multiple processors and/or co-processors. Electronic system 400 further may include random access memory (RAM) or other dynamic storage device 404 (referred to as main memory), coupled to bus 401 and may store information and instructions that may be executed by processor 402. Main memory 404 may also be used to store temporary variables or other intermediate information during execution of instructions by processor 402.

Electronic system 400 may also include read only memory (ROM) and/or other static storage device 406 coupled to bus 401 that may store static information and instructions for processor 402. Data storage device 407 may be coupled to bus 401 to store information and instructions. Data storage device 507 such as a magnetic disk or optical disc and corresponding drive may be coupled to electronic system 400.

Electronic system 400 may also be coupled via bus 401 to display device 421, such as a cathode ray tube (CRT) or liquid crystal display (LCD), to display information to a user. Alphanumeric input device 422, including alphanumeric and other keys, may be coupled to bus 401 to communicate information and command selections to processor 402. Another type of user input device is cursor control 423, such as a mouse, a trackball, or cursor direction keys to communicate direction information and command selections to processor 402 and to control cursor movement on display 421. Electronic system 400 further may include network interface(s) 430 to provide access to a network, such as a local area network. Network interface(s) 430 may include, for example, a wireless network interface having antenna 455, which may represent one or more antenna(e). Antenna 455 may be a deployable antenna that is part of a removable card as described herein.

In one embodiment, network interface(s) 430 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 430 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A network comprising:
a server; and
a handheld device, wherein the handheld device is communicatively coupled to the server via i) a first wireless communication link and ii) a second wireless communications link,
wherein each of the server and the handheld device includes i) a first protocol stack associated with the first wireless communication link, and ii) a second protocol stack associated with the second wireless communication link, and wherein each of the first protocol stack and the second protocol stack, at the server and the handheld device, includes
a physical layer,
a data link layer, wherein the data link layer is above the physical layer,
a network layer, wherein the network layer is above the data link layer,
a transport layer, wherein the transport layer is above the network layer,
wherein the handheld device is configured to download data from the server concurrently over both of the first wireless communication link and the second wireless communication link,
wherein the data being downloaded from the server is respectively partitioned into the first wireless communication link and the second wireless communication link during a first partitioning at an application layer of the server if flow of the data being downloaded in either the first wireless communication link or the second wireless communication link falls behind, wherein the application layer is above a session layer of the server, and wherein data partitioned during the first partitioning is communicated to the session layer of the server, and
during a second partitioning at the session layer of the server, wherein the session layer of the server is above each of i) the transport layer of the first protocol stack and ii) the transport layer of the second protocol stack,
wherein the data partitioned during the first partitioning and the second partitioning are respectively communicated to the transport layer of the first protocol stack and the transport layer of the second protocol stack of the server, and
wherein the partitioned data is concurrently transmitted, from the server to the handheld device, over the first wireless communication link and the second wireless communication link.

2. The network of claim 1, wherein:
the data is partitioned, at the session layer of the server, into a first component and a second component;
the first component is transmitted via the first wireless communications link; and
the second component is transmitted via the second wireless communications link.

3. The network of claim 2, wherein the session layer of the server comprises a partition manager configured to partition the data into i) the first component and ii) the second component.

4. The network of claim 3, wherein the partition manager is configured to partition the data based upon a performance based partitioning scheme.

5. The network of claim 3, wherein the partition manager is configured to partition the data based upon a cost based partitioning scheme.

6. The network of claim 3, wherein the partition manager is configured to partition the data based upon a power based partitioning scheme.

7. The network of claim 2, wherein the handheld device comprises a segmentation and reassembly module configured to reassemble the first component and the second component.

8. The network of claim 1, wherein:
the first wireless communication link comprises a wireless local area network communication link; and
the second wireless communication link comprises a cellular communication link.

9. The network of claim 8, wherein:
the wireless local area network link conforms to a standard selected from the group consisting of IEEE 802.11b, IEEE 802.11g, and Bluetooth; and
the cellular communication link conforms to a protocol selected from the group consisting of Time Division, Multiple Access (TDMA), Global System for Mobile Communications (GSM), and Code Division, Multiple Access (CDMA).

10. The network of claim 1, wherein each of the server or the handheld device is a device selected from the group consisting of:
- a desktop computer system,
- a laptop computer system,
- a cellular telephone, and
- a personal digital assistant (PDA).

11. The network of claim 1, wherein either the server or the handheld device further includes:
- a bus; and
- a processor that is coupled to the bus, wherein the processor is configured to i) process the data being downloaded, and ii) execute instructions relating to processing the data.

12. The network of claim 11, wherein either the server or the handheld device further includes a dynamic storage device that is coupled to the bus, wherein the dynamic storage device is configured to store the data being processed by the processor.

13. The network of claim 11, wherein either the server or the handheld device further includes a static storage device that is coupled to the bus, wherein the static storage device is configured to store the data being processed by the processor.

14. The network of claim 1, wherein at least one transport layer of the server is configured to control the flow of the data.

15. The network of claim 1, wherein at least one data link layer of the server is configured to perform a handoff scheme.

16. A method for downloading data, from a server to a handheld device, via i) a first wireless communication link and ii) a second wireless communication link, wherein each of the server and the handheld device includes i) a first protocol stack associated with the first wireless communication link, and ii) a second protocol stack associated with the second wireless communication link, and wherein each of the first protocol stack and the second protocol stack, at the server and the handheld device, includes
- a physical layer,
- a data link layer, wherein the data link layer is above the physical layer,
- a network layer, wherein the network layer is above the data link layer, and
- a transport layer, wherein the transport layer is above the network layer, the method comprising:
partitioning the data into the first wireless communication link and the second wireless communication link
during a first partitioning at an application layer of the server if flow of the data being downloaded in either the first wireless communication link or the second wireless communication link falls behind, wherein the application layer is above a session layer of the server, and wherein data partitioned during the first partitioning is communicated to the session layer of the server, and during a second partitioning at the session layer of the server, wherein the session layer of the server is above each of i) the transport layer of the first protocol stack and ii) the transport layer of the second protocol stack;

communicating data partitioned during the first partitioning and the second partitioning respectively to the transport layer of the first protocol stack and the transport layer of the second protocol stack of the server; and concurrently transmitting the partitioned data, from the server to the handheld device, over the first wireless communication link and the second wireless communication link.

17. The method of claim 16, wherein the partitioning at the session layer of the server comprises partitioning the data into (i) a first component and (ii) a second component.

18. The method of claim 17, wherein concurrently transmitting the partitioned data includes:
- transmitting the first component via the first wireless communications link; and
- transmitting the second component via the first wireless communications link.

19. The method of claim 17, further comprising reassembling the first component and second component at the handheld device.

20. The method of claim 16, wherein partitioning the data at the session layer of the server is based upon a performance based partitioning scheme.

21. The method of claim 16, wherein partitioning the data comprises using a performance based partitioning scheme.

22. The method of claim 16, wherein partitioning the data comprises using a cost based partitioning scheme.

23. The method of claim 16, wherein partitioning the data comprises using a power based partitioning scheme.

24. The method of claim 16, further comprising controlling the flow of the data being downloaded, from at least one transport layer of the server.

25. The method of claim 16, further comprising performing a handoff scheme from at least one data link layer of the server.

* * * * *